United States Patent
Cabrera et al.

[11] Patent Number: 5,854,754
[45] Date of Patent: Dec. 29, 1998

[54] SCHEDULING COMPUTERIZED BACKUP SERVICES

[75] Inventors: Luis Felipe Cabrera, San Jose; Claudia Beinglas Dragoescu, Gilroy, both of Calif.

[73] Assignee: International Business Machines Corporation, Armonk, N.Y.

[21] Appl. No.: 598,488

[22] Filed: Feb. 12, 1996

[51] Int. Cl.[6] .................................................. G06F 9/455
[52] U.S. Cl. .......................... 364/578; 395/670; 395/672; 395/674
[58] Field of Search ...................... 395/500, 670, 395/672, 673, 674, 650, 700; 364/401, 468.05, 578; 705/8

[56] References Cited

U.S. PATENT DOCUMENTS

| | | | |
|---|---|---|---|
| 5,005,122 | 4/1991 | Griffin et al. | 364/200 |
| 5,133,065 | 7/1992 | Cheffetz et al. | 395/575 |
| 5,179,702 | 1/1993 | Spix et al. | 395/650 |
| 5,345,587 | 9/1994 | Fehskens et al. | 395/650 |
| 5,369,570 | 11/1994 | Parad | 364/401 |
| 5,381,546 | 1/1995 | Servi et al. | 395/650 |
| 5,452,459 | 9/1995 | Drury et al. | 395/700 |
| 5,608,907 | 3/1997 | Fehskens et al. | 395/672 |

OTHER PUBLICATIONS

E.D. Lazowska, J. Zahorian, G.S. Graham and K.C. Sevak, Quantitative System Performance, Prentice Hall, 1994, pp. 127–151.

*Primary Examiner*—Kevin J. Teska
*Assistant Examiner*—Russell W. Frejd
*Attorney, Agent, or Firm*—G. Marlin Knight

[57] ABSTRACT

An apparatus and method is disclosed for scheduling a service (such as backup) in a complex computer installation given constraints of elapsed time and resource utilization. The apparatus form of the invention has two major components: a Modeler and a Scheduler. The Modeler calculates utilization of computer installation resources and elapsed time for the service for any subset of clients and/or networks using a model of the various client types, network types and their interconnections. The Scheduler invokes the Modeler with subsets of clients to find utilizations and elapsed times and adjusts the subsets to generate a schedule (if one exists) which is a list of subsets of clients which can be serviced concurrently without exceeding the utilization criterion or an elapsed time criterion. The Scheduler uses a heuristic involving client and network types to rapidly converge on the list of subsets of clients for the schedule to greatly improve over a trial and error approach.

13 Claims, 7 Drawing Sheets

SCHEDULING COMPUTERIZED BACKUP SERVICES

FIELD OF THE INVENTION

The invention described herein relates to the scheduling of software services in a computing system. More particularly, the invention relates to scheduling software services such as backup in a networked client/server system.

BACKGROUND OF THE INVENTION

A computer installation may consist of a vast array of computers and related devices interconnected by a plurality of networks. There are many types of computers and at least several types of networks which are commonly interconnected. Scheduling services for a significant number of devices in an installation can be a very difficult problem which cannot practically be solved by a trial and error approach because of the huge number of possible combinations presented in typical installations. As will be illustrated in detail below, it is realistic to expect that the total number of possible service scenarios for a multi-network system will be in the tens of millions. There are many types of service for a computer installation which might require scheduling; some examples are compilations of very large programs, regeneration of databases, consolidation of distributed data and backup of data. The following discussion will focus on backup of data, but could be applicable to other services as well. Since large amounts of critical data are stored in computer systems, there is a continuing need to regularly backup data by making redundant copies of the data hard drives, on diskettes, on optical drives, on magnetic tape, etc.

In a networked installation the client/server paradigm is often used to describe the roles of various components in the network. In a large installation, only a fraction of all clients can be backed up at the same time because the server and network cannot handle the load of all clients doing backup simultaneously. Traditionally, system administrators have manually tried different configuration alternatives to decide where to place the backup server machines in a proposed installation and which clients to connect to each backup server. This trial and error process is simplified if all the clients and all the workloads are of the same type, but becomes quite complex if clients are of different types and have different workloads.

Thus, there is a need for an invention which determines schedules for backup or other services in a complex installation without the need for a trial and error approach.

SUMMARY OF THE INVENTION

The invention is an apparatus and method for scheduling a service (such as backup) in a computer installation which has clients of more than one type, a plurality of interconnected networks (potentially of different types) and at least one server. The schedule is prepared using constraints of elapsed time and/or resource utilization if such a schedule exists given the constraints. The apparatus form of the invention has two major components: a Modeler and a Scheduler. The Modeler calculates utilization of computer installation resources and elapsed time for the service for any subset of clients and/or networks using definitions of client types, network types and interconnection of clients and networks in the computer installation. Using this configuration data, the Modeler estimates the time required as well as the percentage of resources needed to provide the service concurrently for a subset of clients by modeling the nodes of the installation which are involved in providing the service to those clients. The Scheduler invokes the Modeler with subsets of clients to find utilizations and elapsed times and adjusts the subsets to generate a schedule which is a list of subsets of clients which can be serviced sequentially without exceeding a utilization criterion and/or an elapsed time criterion. The Scheduler uses a heuristic involving client and network types to rapidly converge on the list of subsets of clients for the schedule to greatly improve over a trial and error approach.

DETAILED DESCRIPTION OF THE INVENTION

The invention is a means and method to specify how to schedule software services in a client/server environment. In the embodiment, which will be described in detail, the invention allows the determination of a schedule, from a very large number of possible schedules, for the backup process so that the process can complete in a specified amount of time and use only a specified amount of resources.

Figure 1:
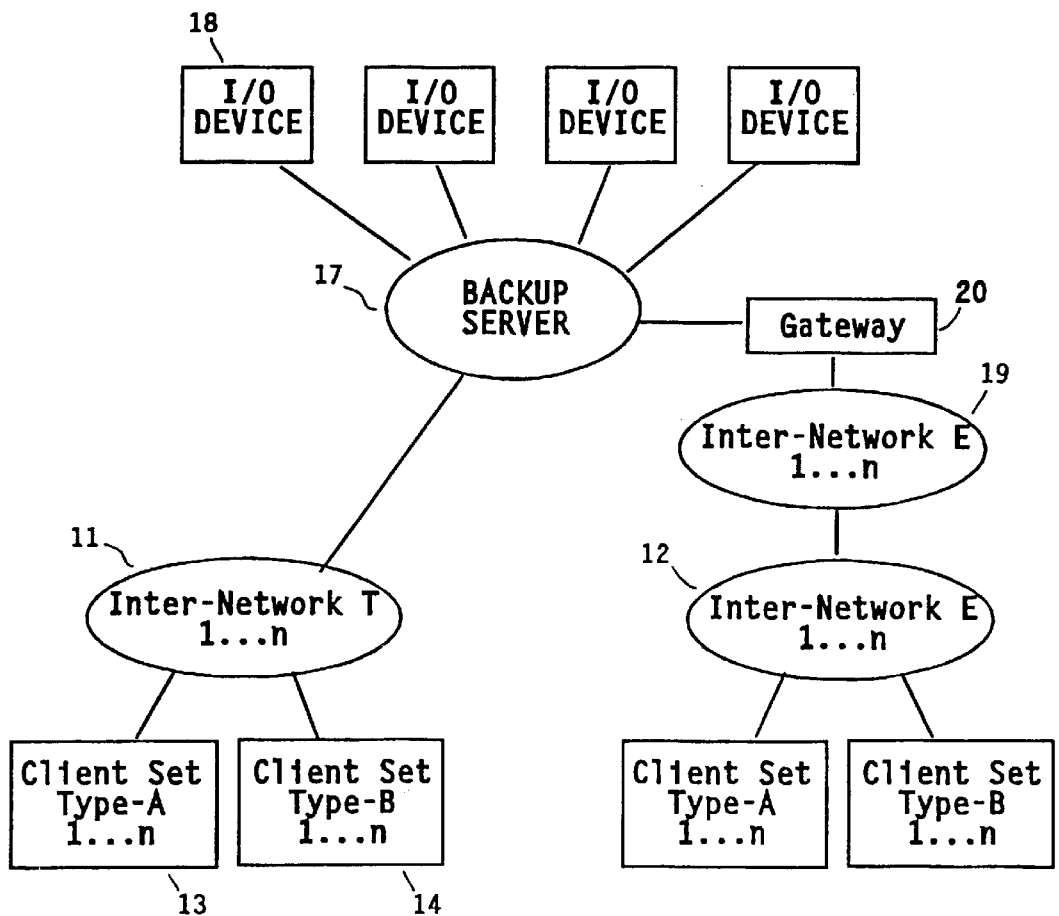
FIG. 1 is a block diagram of a multi-network computer system on which the invention might be applied.

An example of a computer installation in which the invention could be employed is shown in simplified block form in FIG. 1. The backup server 17 has access to one or more I/O devices 18 which might be tape units, optical drives or any high capacity storage system on which the backup data can be stored (and retrieved if necessary). The backup server is typically a computer which has a CPU and an I/O channel to which the I/O devices are attached. There can be multiple backup servers as will be described in the details presented below, but the principles remain the same. The backup server is shown connected to two sets of networks 11, 19 which are of different types (i.e. "T" and "E"). The network sets will be called "inter-networks". The inter-networks can consist of any number (1..n) of interconnected networks. The networks are typically connected to the backup server by devices called gateways. Although an installation might have many gateways, only one is shown 20. Any number of inter-networks can be connected to the backup server. It is also possible for a single network to be connected to the backup server. An installation will typically have several different types of devices which should have their stored data backed up. The devices could include mainframe computers, minicomputers, servers, personal computers, etc.; and each of these could be further divided into differing brands, models and so on. In FIG. 1, there are only two categories of devices which are labeled type-A 13 and type-B 14. In this example, type-A devices and type-B devices are also connected to either type-T or type-E networks. The client-server terminology labels the devices which use the backup server as clients of the backup server. At least some of these devices will typically be servers which have their own clients. In the following, the term "server" will be used to mean "backup server" unless otherwise indicated.

Figure 6:
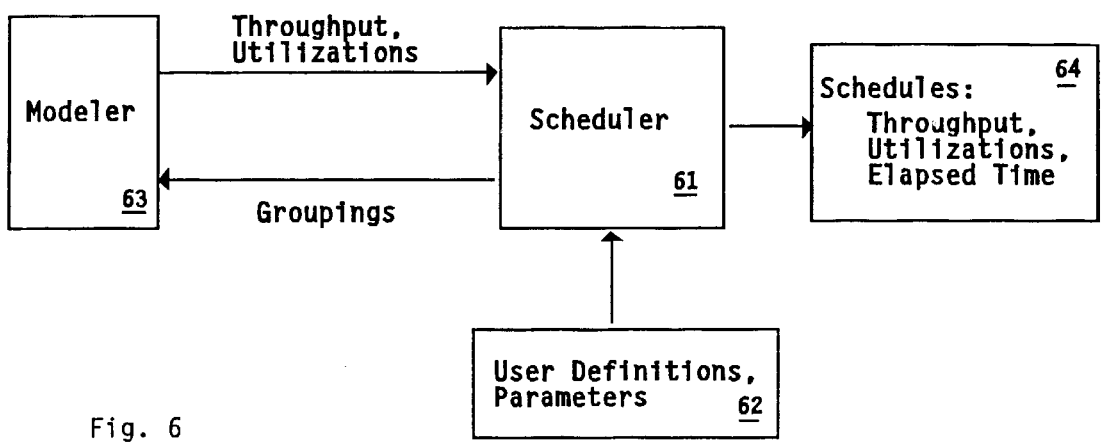
FIG. 6 is a block diagram of a CAP system.

The preferred embodiments of the invention which will be described below will be called the Capacity Planner (CAP). CAP is a software system that estimates the behavior of a particular backup system installation using software modeling techniques and then generates a schedule using the results. FIG. 6 is a block diagram of the embodiment of the invention which will be described below. The Scheduler 61 coordinates the overall activity of the system by accepting the parameters and definitions from the user, invoking the Modeler 63 with various defined groupings, and generating the actual schedules. The Modeler accepts as its parameters the particular groupings currently under study by the Scheduler and calculates the throughput and utilizations for the groupings which are then returned to the Scheduler. The Scheduler uses the heuristics, which will be defined below, to create certain groupings until one meets the parameters of throughput, utilization, and elapsed time which have been set by the user. (This assumes that an acceptable schedule meeting the criteria exists.) The output from the Scheduler can be simply a soft or hard copy showing the schedule which was selected along with the corresponding throughput, utilization, and elapsed time. It would also be relatively simple to have the output from the Scheduler be in such a form that it could be directly executed by the backup system, thus automating the process.

The CAP algorithm requires that the various aspects of the computer installation be defined by the user. These include the number and types of networks, number and types of clients on each, etc. The CAP algorithm also requires as input values of system parameters to estimate performance indices such as the duration of individual backup sessions, the utilization of the main processor of a client machine, the utilization of a network connecting client machines to a server machine, and the utilization of the main processor of the server machine. Even though there may be multiple networks in the system, a single network utilization value is used as a reasonable simplification of the procedure. Reasonable default values for some or all of these parameters could be used by the algorithm in a practical application. Using the device utilization performance indices, CAP calculates, in an iterative manner, possible backup schedules subject to the resource utilization constraints imposed by the user. CAP calculates first which networks can be backed up at the same time, such that the relative resource utilization of the networks and the CPU utilization of the server are within the bounds set by the user. CAP then calculates which clients on these networks can be backed up at the same time, such that the absolute value of the server utilization is at or below the desired value.

CAP also calculates how many identical groups there are, and how long it takes to backup each group, and all groups, one after another. The criterion used to limit the number of clients that can be backed up at the same time is that the network and the server utilizations have to be at or below the value specified by the user. Utilization is defined to be the fraction of the total time that a certain device is busy while performing the backup services.

The measure of throughput, which is the data rate in megabytes/second observed at the network, is used to tie together the resource utilization of the server and that of the network. This is done by calculating the server utilization when it receives data at a given rate.

To tie together the utilization of the networks and that of the server, in CAP the throughput is used. The throughput is set the same for both, with the network as a data-producing service and the server as a data-consuming service. The throughput is defined to be the utilization divided by the total time spent providing the service. Thus, CAP uses the fact that system throughput, equal to the ratio of the target utilization and total service demand, should be the same at the network and at the server. Service demand refers to the actual time that a service center is busy.

CAP divides the installation into groups. A group consists of networks, clients, and of course the server, that can backup at the same time while keeping the networks and server utilizations lower than the specified limits. A group can contain multiple networks of multiple types, and each network can have attached multiple clients of multiple types. In some cases, the whole installation is a group. CAP determines a certain division of the installation into groups. The number of possible groupings can be very large, as will be shown later. The algorithm does not attempt to try all groups, but rather is a heuristic which does not guarantee that the result is the optimal one.

In a proposed installation configuration, CAP tries to determine first which networks (with all of their clients) satisfy the requirement that the ratio of the service demand at the networks and at the server should be approximately the same as the desired ratio of the network and server utilizations. To determine which networks can be backed up at the same time, CAP calculates the estimate of the total time that each network and the server are busy doing backup, then it sorts the network times in decreasing order. CAP keeps adding networks to a group while the ratio of the total time spent on all networks in the group to the total time spent at the server by the clients attached to these networks is smaller than the ratio of the desired utilizations at the networks and server. Then the next group is created. CAP keeps iterating down the list of networks until all are assigned to groups.

After all networks (along with all their clients) are assigned to groups, each group is further examined to ensure that the utilization at the server and networks is not too high in absolute value. This is done by calculating the performance estimates for each group with each client type being examined separately. (Alternatively the client types could be examined in sets rather than one at a time.) If they are higher than the user specified threshold, the group is further subdivided by allowing only part of the clients in the group to backup at the same time.

The performance of the system with only the clients of one type backing up is calculated for one and all clients active concurrently. The number of clients is varied by binary search until all the device utilizations are around the target values. If, on the contrary, the device utilization with all clients of a type active concurrently is lower than the user-specified threshold, clients of the next type are added to the group. This procedure is repeated until the utilizations are around their target values and all clients of all types are assigned to subgroups.

We start by assuming that the maximum number of clients possible participates in the process simultaneously. If the utilization obtained in this case is at target, we are finished. If it is too large, we reduce the number of clients and repeat the process until we find a smaller number of clients which produces a utilization below the target. If the utilization is too low, we continue to the next client type and repeat the loop, by calculating how many clients of the second type to add to the group.

If we need to find less clients to be used, we keep halving the number of clients and executing the model; then, we select the half interval based on the value of the utilization yielded by running the model with the mid-point number of clients. If the utilizations are too large at midpoint, we select the lower half interval. If they are too high, we select the higher half interval. If interval. If they are at target, we return. We start the interval with the lower bound of one client, and the upper bound of Nmax, the maximum number of client considered, as calculated above.

The CAP parameters of interest for the model are:

server CPU speed;

server I/O speed;

number of I/O devices connected to server;

gateway speed;

number of gateways connected to server;

network speed;

network available bandwidth;

number of networks connected to a gateway or to the server;

client CPU speed;

client I/O speed;

number of clients connected to a network;

workload total size;

workload number of files;

workload number of backup transactions generated, a characteristic of the average file size and the file size distribution; and backup characteristics such as compressed or not compressed and selective or incremental. If compressed, the compression factor is also a parameter. If incremental, the fraction of the files changed is also a parameter.

The gateways connected to the server, networks connected to a gateway or to the server, and the clients connected to a network can be of multiple types; and each type can have multiple machines.

The CAP parameters of interest for the scheduling algorithm are:

target server utilization;

target network utilization; and maximum time window available for backing up the whole installation.

Outputs from the model are:

total throughput of the system, in kilobytes (KB)/second and throughput by class;

backup time for each class;

total size of the backup data in megabytes (MB); and utilization of each device (client, network, server) (utilization =service demand divided by total backup time).

Outputs from the scheduling algorithm are:

throughput of the system, in KB/second;

average response time of the whole system;

total size backed up, in MB; and a list of all groups which can be backed up concurrently. For each list, the number of identical groups that exist in the system, the backup time, throughput, participating clients and networks, the amounts of data for each class and network type participating, and their utilizations.

The system being modeled is composed of service centers (where requests queue for service), which are the networks, gateways, server CPU and server I/O devices, and of "waiting elements" (the clients or jobs in the system), which generate units of work. The service centers are characterized by service demand and the length of the queue of requests. Queues are commonly used in modeling to simulate processes where waiting time is involved. The installation can be pictured as a tree structure with each leaf generating a workload which is processed by the nodes (service centers). The processing by the nodes requires a finite amount of time. Graphically inputting a tree structure is one way of defining the structure to the CAP system. The root of the tree is the backup server. The workload generated during the backup process by each client will be processed by a certain number of service centers. For example, backing up data on a personal computer might require work by the personal computer, one or more networks/gateways through which the data must pass, the server CPU, and the server's I/O devices. The model maps these nodes into its service centers which give a measure of the times required to process the data from its home on a client to a backup I/O device.

In the following, the term "class" will be used to refer to a client type and a workload type. An example of a class would be all clients that are IBM PS/2 personal computers which have approximately 300 MB to back up, consisting of approximately 1000 files, and which are connected to a TokenRing network.

The term "workload" refers to all the work that the system needs to perform. In the backup system, this translates to all the files to be backed up by a set of clients. A job is a unit of work executed one at a time by each client. For example, units might be pages of data to be transmitted (for example, 4KB of data) or transactions to be finished. However, for the purpose of calculating the modeling parameters, the sizes of the complete client workload are used to keep the floating point arithmetic operations to a minimum. The final result depends only on the total size of the client workload as the individual job sizes cancel out in the calculations.

The backup system (BUS), which will be modeled in the description of the embodiment described below, is a "closed type" system, which means that the number of jobs is kept constant and equal to the multiprogramming level. (Other types of BUS's can be used with the invention by altering the model.) The multiprogramming level N is the number of clients in the system. In reality, even though one transaction is processed at a time, both the network and server operate simultaneously, processing small pieces of files. Therefore, the effective number of clients of each class is double the number computed and the service demand at each service center is smaller by the same factor.

Figure 2A:
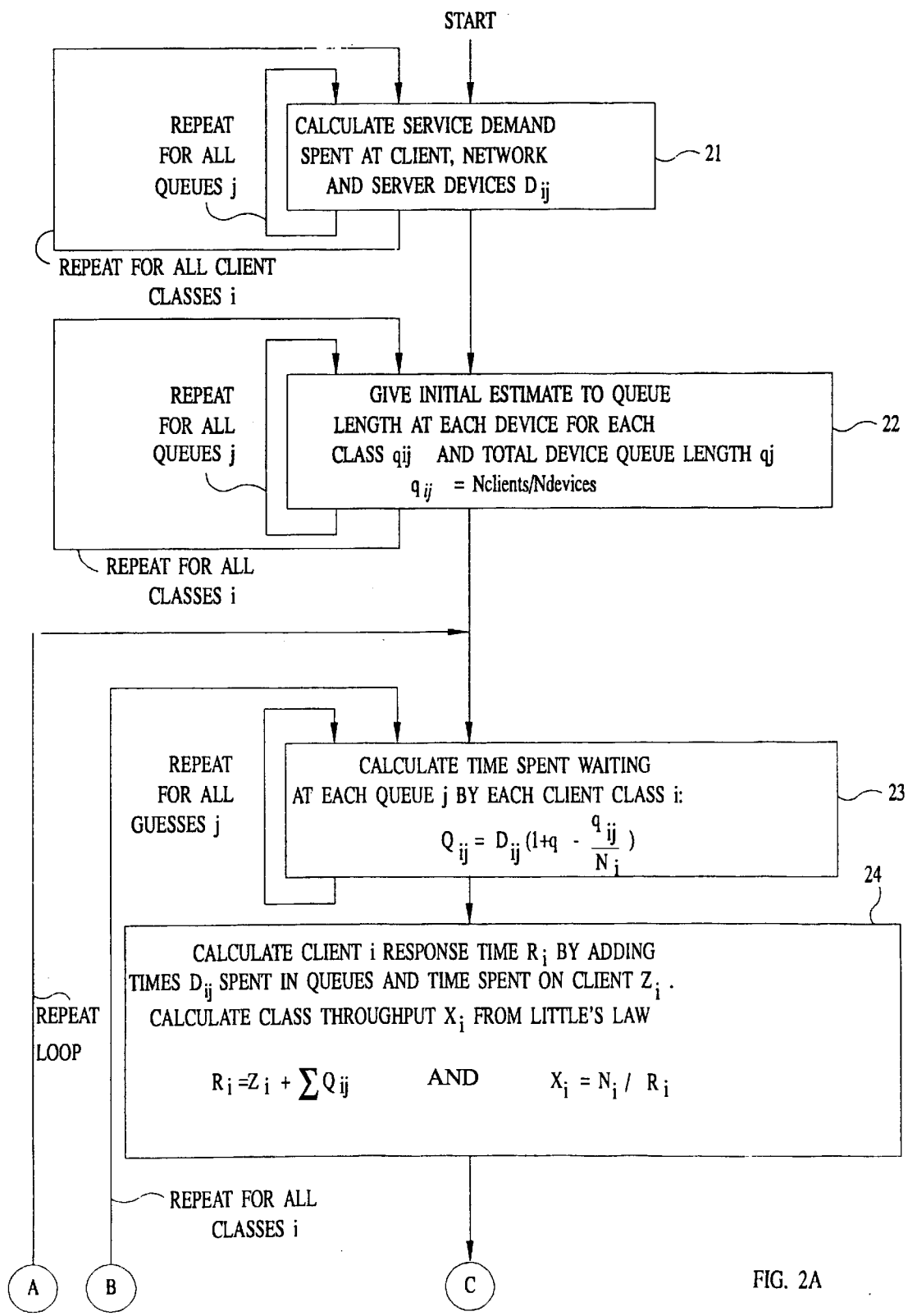
FIGS. 2a and 2b combined are a flowchart of the method for modeling the multi-network computer system according to the invention.
Figure 2B:
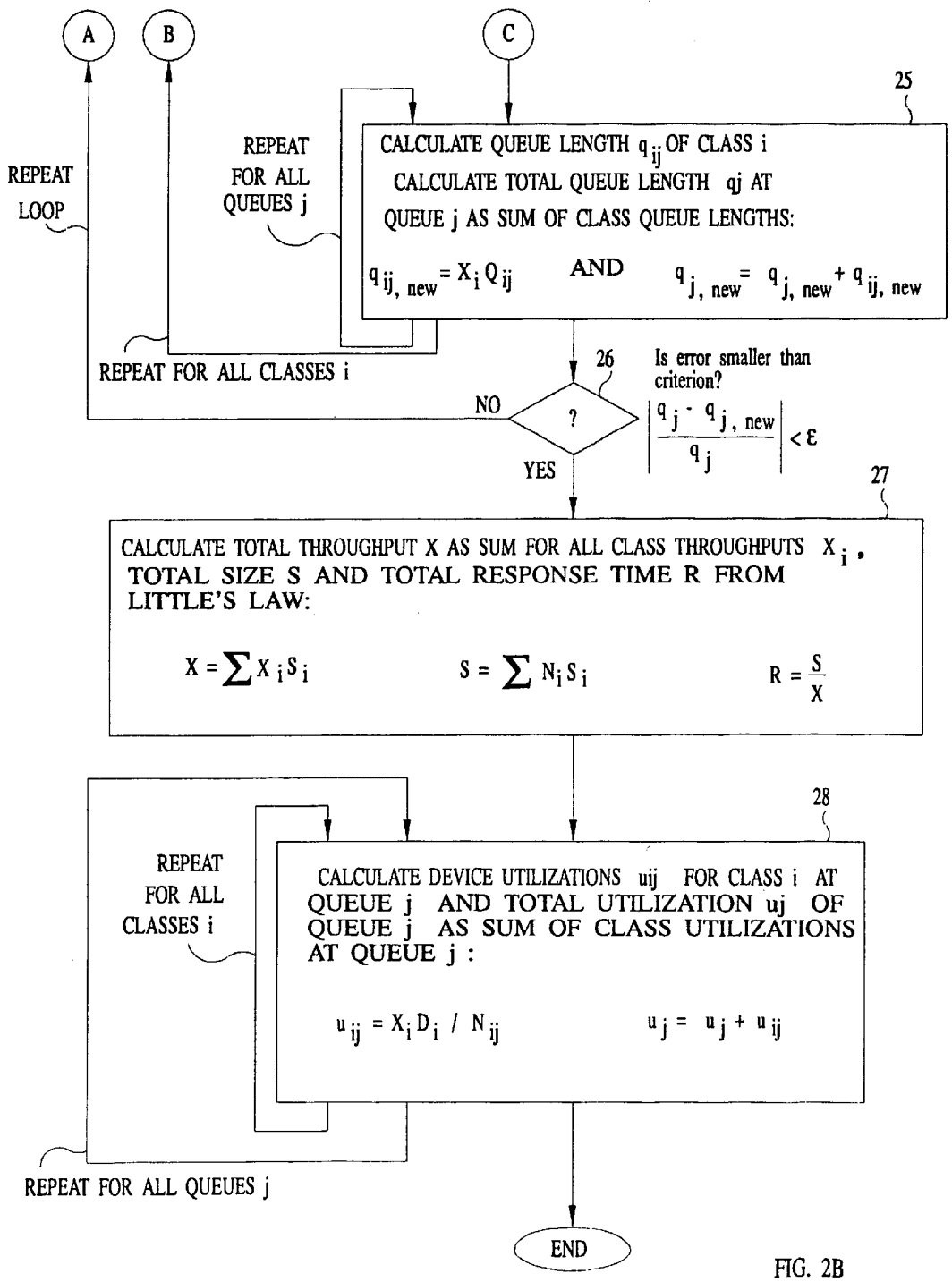

FIGS. 2a and 2b comprise a high-level flowchart of the modeling process, which will be described below. To compute estimates, the service demand is calculated for each class at each service center. This is done by adding up the times to execute BUS operations like processing a file, processing metadata (the system data about files), processing the reading of files, sending files over the network, and compressing files. These processing times are determined in terms of the number of instructions necessary to execute an operation on the client or the server, the speeds of the I/O devices, the speeds of the client and server CPU, the number of files processed, the total size of the files processed, and the network and gateway speeds.

The client service demand is the sum of the time to read a file from disk, to process the file data, to process the file metadata, and to process all the BUS transactions generated during the request. The read time can be computed as the total file size, divided by the effective I/O speed of the disk subsystem. The other times are computed using characteristic values of instruction counts or operation counts, obtained from laboratory measurements, times the file size for data, or times the number of files for metadata operations, divided by the CPU speed as measured in MIPS or SPECints. The server time is calculated in a similar manner. The network time is also calculated similarly, as the sum of times to transfer data and the time to transfer metadata (which is much smaller in size usually). These times are calculated as the total size transmitted, divided by the effective network speed (taking into account bandwidth availability).

After all these calculations are done, we have the values of $D_{ij}$, the service demand of class i at service center j 21. Each queue length is given an initial estimate, the same for all queues, and it is the total number of clients in the system divided by the total number of service centers 22. The next thing to do is to estimate the throughput of the whole system, which is the calculation of the queue length $q_{ij}$ of each class i at each service center j, because it determines the time spent waiting at each service center 23. Once we know these times, we calculate the total time spent by a client job in the complete system, by adding all the times spent waiting and executing at each service center 24. Next, the value of the queue length of each class at each service center is calculated by an iterative process 25. Each iteration yields a new value of the queue length $q_{ij}$. This value is compared with the previous value of the queue length, and the loop is repeated until the values converge by differing by less than an acceptable value.

Inside this iteration loop there is an additional loop over each class: for each class i we calculate the time $Q_{ij}$ spent at each service center j 23. This time is calculated as the service demand $D_{ij}$ times the number of jobs in the queue ($q_j$+1−$q_{ij}$/N). The total queue length at the service center is $q_j$, and the queue length of the class i is $q_{ij}$. The correction factor $q_{ij}$/N accounts for the fact that the client does not see itself waiting in the queue, and the 1 accounts for the client itself. Then, we calculate the response time $R_i$, as the sum of all times $Q_{ij}$ spent at all service centers, plus the "waiting time" $Z_i$ at the client 24. Then, we calculate the class throughput $X_i$ using Little's law, as the number of clients of this class $N_i$ divided by the response time $R_i$ 24. Then, we recalculate $q_{ij}$ as the product of the class throughput $X_i$ and the time spent at device j, $Q_{ij}$ 25. We add this new value to the total queue length $q_j$, and continue to iterate 25. For each service center, the error is calculated in a standard manner as the absolute value of the difference between the new and old values of the queue length, divided by the old value. The exit criterion is that each error has to be less than a preset value 26. For robustness, there can also be an exit criterion after a preset number of iterations through the loop, to prevent an infinite loop.

After the loop is exited, the final values of the total throughput, response time and device utilization are calculated. Total throughput is the sum of all the class throughputs $X_i$, calculated above in the loop, expressed on a KB/second basis, i.e. multiplied by the job size $S_i$ 27. The average service time is the total size of all clients (the sum of all $S_i$), divided by the total throughput X 27. The utilization of each device is the sum of the utilizations of each class i at the device j 28. This utilization is calculated as the product of the service demand of the class at the device, $D_{ij}$, and the class throughput $X_i$, divided by the number of identical devices $N_i$ 28.

Figure 3:
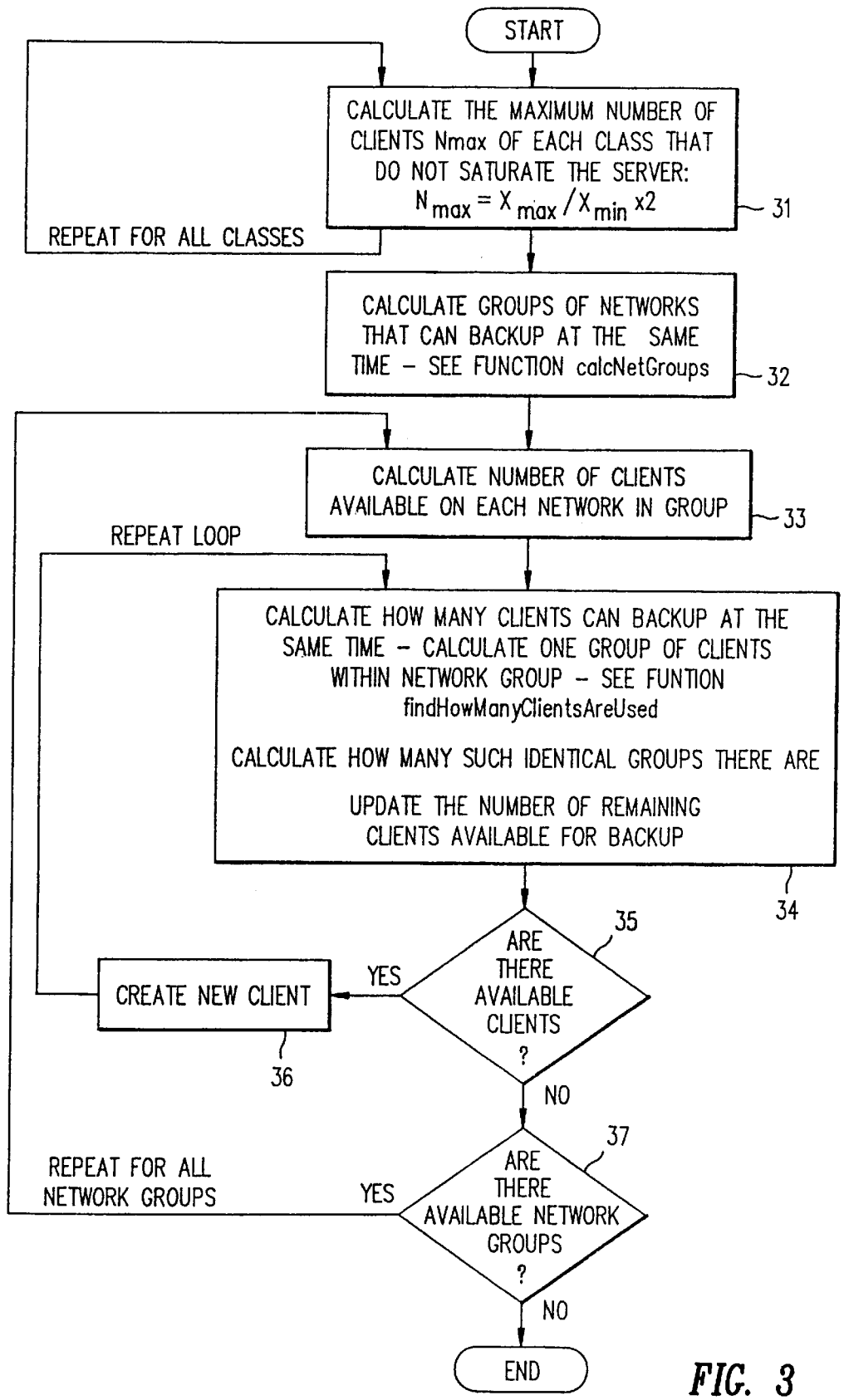
FIG. 3 is a flowchart of the method for scheduling the backup process for the multi-network computer system according to the invention.

The scheduling algorithm which computes the schedules in CAP will now be described with references to FIG. 3.

First, we calculate Nmax, the maximum number of clients of class i that can backup at the same time without saturating the server 31. This number is calculated based on the knee point of the curve of throughput versus the number of clients in the system. The knee point is the number of clients where the throughput of the system is about 70% to 80% of the maximum possible, and its value is calculated as the maximum throughput of the system (achieved when all clients are participating in the backup), and the minimum throughput, achieved when only one client is participating in the backup. In order to consider enough clients, we start with Nmax as twice this value. This value is calculated separately for each class, and we loop over all available classes to calculate it. Nmax for each class i is found as two times the ratio of the optimum throughput for the configuration to the throughput for one member of the class. The optimum throughput for the configuration is obtained by running the model with all clients backing up. The throughput for the class is obtained by running the model with only one member of the class.

Next, we calculate the number of networks that can backup at the same time while keeping the server and the networks below the desired utilization values 32. The function which does this is called "calcNetGroups", and it works by comparing service demands at the server, with service demands at the networks, taking into account the utilizations desired. This computation can be done because the system throughput is the same for all devices. This means that the ratio of the service demand to the utilization should be the same at the server and networks, when they are all at their target utilization.

Figure 4:
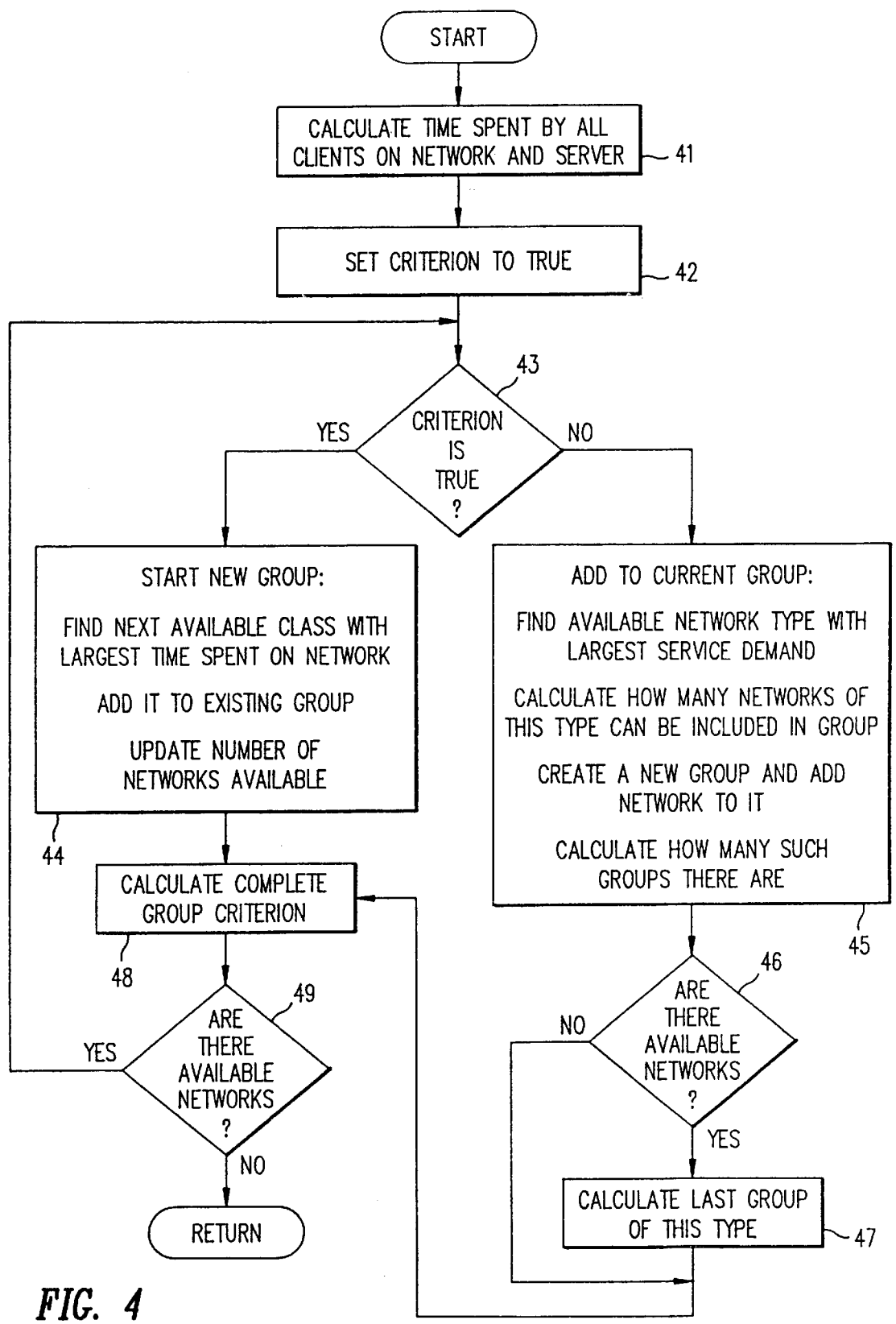
FIG. 4 is a flowchart of the "calcNetGroup" function used in the described detailed embodiment of the invention.

The "calcNetGroups" logic is depicted in FIG. 4. In order to determine which networks can participate in the backup at the same time, the networks are ordered in decreasing order of the service demand spent on them by all classes. They are added to the current group until the total network service time (the sum of the service times of all networks divided by the network target utilization) is larger than the server service demand, divided by the server target utilization. At that point, the group is closed, and another group is started, until all the networks are assigned to a group.

CAP first calculates the service demand at the network plus at the gateway (when it exists) of each class, then calculates the total network service demand by adding all the contributions from the different classes 41. Then it goes through an iteration loop, repeated while there are still networks not accounted for.

The loop starts by checking to see if the group is complete 43 (the criterion). It does this by checking that the difference of the server and the network group times is positive, meaning that the time spent on the server is larger than the time spent on all networks, i.e., the server is slower than the group of networks. If yes, a branch is taken where a new group is created 44. (Initially the criterion is set to true to start a new group the first time the loop is executed 42.) If no, another branch is taken where another network is added to the current group 45. The first time in the loop, or if a group is complete, we take the branch where a new group is started. The network with the largest service demand is found, and assigned to the group. Then we calculate the number of networks and gateways still available of this type. Then CAP calculates how many networks of this type can backup concurrently with the server, by comparing the ratios of the service demand and target utilization, as described above. The minimum of these three numbers (maximum possible, currently available, and suggested by the user) is taken.

The number of suggested concurrence is a preset number, added to introduce the benefit of experimental experience with existing enterprises. We calculate how many times we can repeat a group, based on the number of networks available and on the number allowed to backup at once. Then CAP checks to see if there are any networks left 46 as remainder; and if the answer is yes, it creates a last, smaller group 47. Then it recalculates the criterion for group completion 48. The process stops when all the networks have been accounted for 49; otherwise, we repeat the loop 43.

After returning from the "calcNetGroups" function, CAP has the groups of networks that can be backed up together. Now, CAP determines which clients within these networks can backup together at the same time, i.e., it further fragments the schedules into smaller groups (FIG. 3, 33). In the routine "calcNetGroups", we only made sure that the ratio of the network and server utilizations have the desired values. Now CAP has to actually calculate the utilizations using its internal analytic model of BUS and make sure that they are below the desired values. To do this, CAP traverses the groups of networks and for each group calculates the groups of clients and the backup times.

CAP loops over all the groups of networks, and for each group calculates the numbers of clients still available. Then, it calculates the number of clients that keep the network and server below the desired utilization. This is done by function "findHowManyClientsAreUsed", described below. CAP records the calculated utilizations of the devices for this run, calculates how many times one can repeat this run with identical groups, updates the numbers of remaining available clients of each type, and records the performance statistics for this run (throughput, response time, service center utilizations) 34.

Then, CAP proceeds to the next clients used is equal to of clients used is equal to the number of clients used so far, we exit the loop 35. Else, we still have available clients; so we repeat the loop and we create a new client group 36, and repeat the above process. This is also the end of the loop where we traverse the network groups, i.e., when exiting this loop, we have finished a pass through the loop for each network group, and we proceed to the next network group; or if we traversed all of them, we exit 37.

Figure 5:
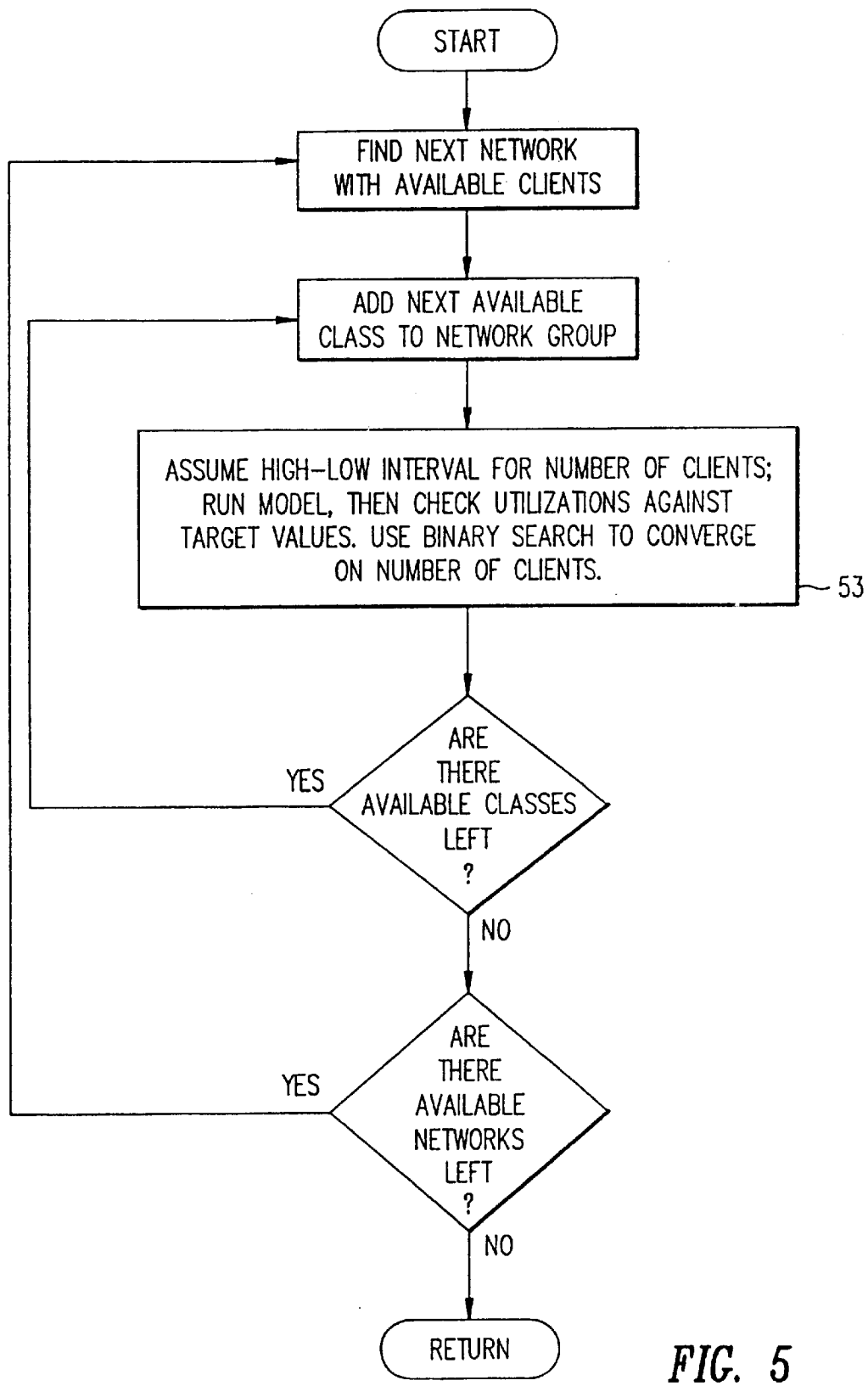
FIG. 5 is a flowchart of the "findHowManyClientsAreUsed" function used in the described detailed embodiment of the invention.

To determine how many clients can participate in each run, we have function "findHowManyClientsAreUsed". FIG. 5 illustrates the logic flow for this function. In it, we have an iteration loop which traverses all networks in a group of networks looking for the first network with available clients 51. Then, it goes into an internal loop, over all the classes that belong to this network, finding clients to be assigned to this run 52. The number of clients which can be run while meeting the utilization criteria are found by assuming a high and low value, running the model for each value, then adjusting the value using binary search techniques to converge on a number of clients which yield utilizations close to the target values 53. (Of course, for some target utilizations, there might not be a solution.) The inner loop is repeated until all classes have been included 54. The outer loop is repeated for all networks 55.

Upon completion of the scheduling algorithm we have subdivided the system into groups that can be backed up at the same time while keeping the server and network at or below a target utilization set by the user.

To decide how many BUS servers are needed and where to place them, we compare the total backup time for the whole enterprise with the available time window to perform the backup, which is one of the parameters of the program that is requested from the user. If the total backup time is less than the available time window, we are done and have to do nothing.

If the total time available for backup is less than the available time window, this means that we need to have more than one BUS server in the enterprise. We then examine the groups' outputs by the algorithm, and cluster them such that together they take less time to backup than the available time window. For each such group, we need one BUS server. We have achieved two goals: we determine how many servers we need, and where to place them in the installation.

There is also the possibility that the time window to do the backup is smaller than the shortest backup time of any group. In this case the problem has no solution as stated. The system administrator has to modify the base configuration and then retry using CAP. Possible changes that the administrator can use include decreasing the workload on each machine, decreasing the number of clients per network, upgrading the clients to be faster models, and upgrading the networks or the servers.

Appendix A includes C++ source code illustrating a possible embodiment of the invention's scheduling algorithm, including the functions described above.

Extending the Method to Software Services other than Backup It is possible to use the invention described to schedule software services other than backup. The general problem being solved is how to schedule a relatively large number of centrally managed tasks using a finite amount of system resources to accomplish the tasks. Compiling a large number of source code files or updating databases might be examples where similar problems could arise. For the general case of a generic software service, the model could be changed to predict performance of the general software service. The scheduling algorithm uses given constraints to arrive at an acceptable schedule out of a very large number of possibilities. In the backup case, the parameter varied is the number of BUS clients of each type. In the case for other software services, the parameter would change accordingly. In CAP, the constraint is that the utilization has to be less than a preset value. CAP produces values of the utilization, which we compare against a preset maximum value. In the other cases, some other parameter would be produced and its value compared against the constraint.

Benefits of Using the Invention

The following sample calculation illustrates how much time the invention can save in creating a schedule. We will first calculate the total number of existing scenarios that have to be run in a trial-and-error approach. Each scenario has a unique combination of clients and networks and requires running the model once. A scenario can have any number of clients of any type present, so the total number of scenarios is the sum of all possible combinations of clients types and numbers (and the networks attached to them). Any client type I, that has $N_i$ clients, can be present in $N_i+1$ possible ways: no clients of this type present, one client present, two clients present, up to all $N_i$ clients present. This is the number of cases for the clients attached to one network of type j, but there are $N_j$ networks of type j, and these scenarios apply for each network independently. The total number of scenarios for the clients of type I attached to networks of type j is then $(N_i+1)$ multiplied by itself $N_j$ times, which means $(N_i+1)$ to the power $N_j$. The total number of scenarios for all client types attached to all network types is the product of all scenarios for all client types:

$$N\text{total} = \text{product over all client types} I \text{ of } (N_i+1)^{N_j}$$

where $N_i$ is the number of clients of type I attached to each network of type j, and $NJ=N_j$, which is the number of networks of type j present.

We will now calculate the number of scenarios run when the algorithm of the invention is used.

There are two typical cases: one in which there are many clients of each type, and there are a total of Nct client types. In this case, the algorithm tries to put together all clients of one type before continuing to the next type. For each client type, the number of clients is determined by binary search from one client to a maximum number previously calculated, which in most practical cases is less than 100. This is done once for each network type, because the number of networks present is known since it was calculated. Since a binary search divides the interval in half at each iteration, the number of iterations is, at most, logarithm in base 2 of 100, which is approximately seven. Therefore, in this case, the total number of scenarios run is less than:

$$Ntotal = 7 \times Nct$$

where Nct is the number of client types present.

The second case is the opposite, in which we have one client of each type. In this case, there's no need to calculate the total number of clients of the type; but the scenarios are recalculated while adding one client at a time until the networks or server utilizations become higher than the limit. Assuming there are on the average Nl clients in one configuration, this means that there are approximately Nl scenarios run to determine each configuration, and there are a total of Ncls/Nl configurations. The total number of scenarios is then:

$$Ntotal = Nl \times N(Ncls/Nl) = Ncls$$

where Ncls is the total number of clients (and types) present.

In each case described, we have reduced the number of scenarios run from an exponential dependence on the number of clients present, to a linear dependence.

To exemplify the time savings, let's consider two enterprises that exemplify the two situations described above:

a) A large enterprise with many workstations of the same type. The workstations are the clients. There are two types of networks, with two networks of each type. Each network has two types of clients, with nine clients of each type. The total number of network types in the enterprise is two, and the total number of networks is four. The total number of client types in the enterprise is four, and the total number of clients is $9 \times 8 = 72$. The total number of scenarios that need to be run in a trial and error approach is:

$$Ntotal = (9+1)^2 \times (9+1)^2 \times (9+1)^2 \times (9+1)^2 = 10^8 = 100,000,000.$$

When using the algorithm, this number is reduced to less than:

$$Ntotal = 7 \times 4 = 28.$$

Thus, the savings are enormous.

b) The clients are actually file servers themselves, so there are only 20 clients in the whole enterprise, each of a different type, each attached to its own network.

In the absence of the algorithm, the total number of scenarios that need to be run is:

$$Ntotal = (1+1)^{20} = 2^{20} = 1,048,576.$$

Using the algorithm, the number of scenarios that have to be run is:

$$Ntotal = 20.$$

This, again, is a significant time savings.

Example Showing Application of the Method

Consider the enterprise structure shown in FIG. 1, which is similar to the big enterprise described above. In the following, specific current hardware and software will be assigned to the generic components for purposes of illustration; but any computers capable of acting as servers could be substituted by altering the associated characteristics used for the calculations. Assume that the server is an RS/6000 workstation with four disk drives attached. "Network 1" is a collection of four interconnected Token Ring (TR) networks and "Network 2" is a collection of four interconnected Ethernet (ET) networks. There are four TR networks and four ET networks. Each TR network has two classes of clients attached: the first class, "Client 1" in FIG. 1, is 20 RS/6000 workstations (AIX-TR) per network, or a total of 80. The second class, "Client 2" in FIG. 1, is 80 PS/2 personal computers (OS/2-TR) per network, or a total of 320. Each ET network has also two classes of clients attached: the first class, "Client 3" in FIG. 1, is 10 RS/6000 workstations (AIX-ET) per network, or a total of 40. The second class, "Client 4" in FIG. 1, is 40 PS/2 personal computers (OS/2-ET) per network, or a total of 160. The characteristics of each class, including its workload (WL), are shown in Table 1. The suggested utilization at the server and network is 80% and the time window available for backup is six hours.

The total number of network types in the enterprise is two, and the total number of networks is $2 \times 4 = 8$. The total number of client types in the enterprise is four, and the total number of clients is $4 \times (20+80) + 4 \times (10+40) = 600$. The total workload size per enterprise is 248 GB.

TABLE 1

Classes in sample configuration

| Class | Network type | Client type | Number of clients | Wl size per client (MB) | Number of files per client |
|---|---|---|---|---|---|
| AIX-TR | TR | AIX | 80 | 1000 | 100 |
| OS2-TR | TR | OS2 | 320 | 300 | 3000 |
| AIX-ET | ET | AIX | 40 | 1000 | 1000 |
| OS2-ET | ET | OS/2 | 160 | 200 | 20000 |

First, we calculate for each class the maximum number of clients that the system can handle, Nmax. We run the model with all clients of all classes participating, and determine the maximum throughput attainable, which is 2,395 KB/sec. Then, we run the model with only one AIX-TR client in the configuration, and get a throughput of 961 KB/sec. The maximum number for the AIX-TR class is:

$$Nmax = 2395/961 * 2 = 4$$

We perform similar calculations for the other classes: we run the model with only one client of the class in the configuration; then, we calculate Nmax. The results are shown in Table 2.

TABLE 2

Maximum number of clients calculated for each class

| Class | Throughput for 1 client (KB/sec) | Nmax |
|---|---|---|
| AIX-TR | 961 | 4 |
| OS2-TR | 245 | 19 |
| AIX-ET | 916 | 5 |
| OS2-ET | 158 | 30 |

Next, we determine the groups of networks: first we calculate the service time spent by all the clients associated with each network type at the network and server queues. The results are shown in Table 3.

TABLE 3

Service times for classes

| Network type | Service demand at network (sec) | Service demand at server CPU (sec) | Service demand at server I/O (sec) | Service demand at server log (sec) | Networks per group |
|---|---|---|---|---|---|
| TR | 91256 | 57265 | 9778 | 24130 | 2 |
| ET | 39900 | 47782 | 4000 | 6899 | 1 |

Next, we select the largest time spent at any server queue: it's the server CPU for all networks; therefore, we compare the time spent on the client and network to the time spent on the server CPU. Next, we arrange the networks in decreasing order of service demand; in our case, the TR network is first and the ET is second.

Next, we calculate the number of networks that can participate in the first group, for the network type at the top of the list—the TR network: we divide the service demand at the network (Table 3, column 2) by the service demand at the server (Table 3, column 3), normalized by the respective suggested utilizations at the network and server (both 80% in our case):

$N = 91256/0.80/(57265/0.80) + 1 = 2.$

The resulting number of networks per group is two, also shown in Table 3. Therefore, we have two identical groups, of two TR networks each.

A similar calculation for the ET network type results in four groups of one network each, also shown in Table 3.

Now, we calculate the number of clients in each group that can participate at the same time. We start with class AIX-ET. We run the model for Nmax (5) clients. The resulting service center utilizations, which are our matching criterion, are shown in Table 4. For Nmax (5) the network utilization is too high, i.e., it exceeds the target of 80%. Then, we run the model for one client. The utilizations are found to be too low, i.e., not close enough to the target utilizations. So we run the model at the mid-interval (3 clients). The utilizations are again too high, so we run the model again at mid-interval (2) clients. Now, both the network and server utilizations are close to or below the target; so we stop here. We have reached the right number of clients.

TABLE 4

Results of model runs for the AIX-ET class

| Number of clients | Network utilization (%) | Server utilization (%) | Server utilization (%) | Server utilization (%) |
|---|---|---|---|---|
| 5 | 96 | 46 | 11 | 8 |
| 1 | 46 | 22 | 20 | 4 |
| 3 | 88 | 42 | 13 | 7 |
| 2 | 74 | 36 | 16 | 6 |

This means that this group will have one ET network backing up at once, with two AIX clients attached to it participating. We need to repeat each group 20 times to finish backing up all 40 AIX-ET clients.

We repeat the above calculation for the other classes, and the final results for all classes are shown in Table 5:

TABLE 5

Final results of model runs for all classes

| Class | Final number of clients in group | Network utilization (%) | Server utilization (%) | Server utilization (%) | Server utilization (%) |
|---|---|---|---|---|---|
| AIX-TR | 2 | 72 | 65 | 16 | 6 |
| OS2-TR | 4 | 46 | 70 | 10 | 40 |
| AIX-ET | 2 | 74 | 36 | 16 | 6 |
| OS2-ET | 5 | 40 | 78 | 4 | 11 |

Now, the final results of all runs are shown in Table 6; and they are the composition of each group, how many identical groups there are, and the total backup time and throughput for each.

TABLE 6

Final composition of groups and backup performance characteristics

| Group | Number of identical groups | Networks included | Clients per network included | Backup time (hr:min) | Backup throughput (KB/sec) |
|---|---|---|---|---|---|
| AIX-TR | 20 | 2 TR | 2 AIX-TR | 7:45 | 2864 |
| OS2-TR | 40 | 2 TR | 5 OS2-TR | 15:32 | 1716 |
| AIX-ET | 20 | 1 ET | 2 AIX-ET | 7:33 | 1470 |
| OS2-ET | 32 | 1 ET | 5 OS2-ET | 13:37 | 652 |

The total backup time for the whole enterprise is 44.5 hours, with an average throughput of 1550 KB/sec.

Sample output from a software embodiment of the invention using the input in the foregoing example is included as Appendix B.

The invention has been described by way of a preferred embodiment, but those skilled in the art will understand that various changes in form and detail may be made without deviating from the spirit or scope of the invention. The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer programming code is used by either executing the code directly from the storage device, by copying the code from the storage device into another storage device such a hard disk, RAM, etc. or by transmitting the code on a network for remote execution.

The method form of the invention may be practiced by combining one or more machine readable storage device containing the code according to the invention with appropriate standard computer hardware to execute the code contained therein. An apparatus for practicing the invention could be a one or more computers and storage systems containing or having network access to computer programming code according to the invention.

Appendix A

```
         /*-----------------------------------------------------------------*/
         retCode    Model::doModelFunc()
         {
                 retCode rc = RC_SUCCESS;

//reset counters of numbers of elements used to 0
                 resetServer();
                 traverseAllClients(resetGateway, resetNetwork, 0);

//calculate shortest time - if all backup at same time
                 //traverse networks and set Nnew=Nhigh for nets, gates and cls
                 //#gates, nets and cls is all the list
                 traverseAllClients(setAll, setAll, setAll);

//run model for these # of cls, nets, gates
                 rc = mean_value_model();

                 return rc;

} // -- end doModelFunc ---------------------------------------------

/*-----------------------------------------------------------------
          * Name:    doModelFunc
          *
          * Action:
          *        does capacity planning
          * Arguments:  none
          *
          * Return :
          *
          *
          * Side
          * Effects:
          *
          *-----------------------------------------------------------------*/
         retCode    CapModel::doModelFunc() { retCode rc = RC_SUCCESS;
```

SA9-96-001                                                A1

```
            //reset counters of numbers of elements used to 0
            if ((rc = Model::doModelFunc()) not_equal RC_SUCCESS) return rc;
            //output best possible backup time
            total_resp_time = resp_time;
            best_truput = truput;
            if (trace)
            {
                report_msg = BEST_POSSIBLE_TIME;
                #ifdef CMDLINERUN
                reportRun(cout);
                #endif
                reportRun(output);
            }

//reset counters of numbers of elements used to 0
            resetServer();
            traverseAllClients(resetGateway, resetNetwork, resetClient);
            //traverse networks and set Nnew=1 for nets, gates and cls
            traverseAllClients(setOne, setOne, setOne);

//calc longest time, if we backup each client individually
            traverseParticipatingClients (0, 0, calcMaxRespTime);

//report
            total_resp_time = worst_resp_time;
            if (trace)
            {
                report_msg = WORST_POSSIBLE_TIME;
                #ifdef CMDLINERUN
                reportRun(cout);
                #endif
                reportRun(output);

                //get R for 1 client; if < Twindow print msg "anything will do"
                //target time is larger than largest backup time
                if (time_window > worst_resp_time) {
                    report_msg = CAN_USE_ANY_NUMBER;
                    #ifdef CMDLINERUN
                    reportRun(cout);
                    #endif
                    reportRun(output);
                }
```

SA9-96-001                                  A2

```
} //end if trace

//calc. groups of networks that can be backed up at same time
calcNetGroups();

//traverse groups of networks and for each calculate backup time
//sg is part of CapModel - pointer to current set of gateways used
total_resp_time = 0.0;
overall_size_ch = 0.0;
for (sg = sgL->gotoHead(); sgL->isnotatEnd(); sg = sgL->advance())
{
    if (trace) output << " NEW SERVER " << endl;

//print network groups of this server
    if (trace) sg->networkGroupList->traverseList(printNetworkGroup);

//set # of clients, nets and gates used to 0:
    resetServer();
    traverseAllClients(resetGateway, resetNetwork, resetClient);

//calculate number of clients available for this run:
    traverseAllClientGroups(calcNumClientsFirst);

//all_cls_used = True;
    //calc. the # of clients in this batch; if not all backed up,
    //repeat by creating new server groups (inserted after current one
    //in server group list), and creating a new batch, until all
    //clients of this server group are finished
    //repeat a finite # of times
    uint batch_cntr;
    #define LOOP_CNTR 20
    for (batch_cntr = 0; batch_cntr < LOOP_CNTR ; batch_cntr++) {
        if (trace) output << "batch cntr=" << batch_cntr << endl;

//calculate number of clients per batch that keeps the network
        //util at the target value
        if ((rc = findHowManyClientsAreUsed()) not_equal RC_SUCCESS)
            return rc;

//save in network group the # clients used in this batch:
        traverseAvailableClientGroups(createClientGroup);
```

```
                //save util of gates and nets from this run in the
        //networkgroup object
                sg->networkGroupList->traverseList(recordUtils);

//calc. # batches we can have of this type - min. of
        //num/num_used
                //for every client type on the network - start with a large
                //value
                sg->client_batch_num = s.num_cls;
                traverseClientBatches(calcNumBatches);

//update remaining available clients of each type -
                total_resp_time += resp_time * sg->num * sg->client_batch_num;
                sg->resp_time = resp_time;
                sg->truput = truput;
                sg->cpu_util = s.cpu_util;
                sg->io_util = s.io_util;
                sg->log_util = s.log_util;

//report batch
                report_msg = RECOMMENDED_TIME;
        #ifdef CMDLINERUN
                //reportRun(cout);
                reportBatches(cout);
        #endif //reportRun(output);
                reportBatches(output);

//update number of clients used and calc. number used in next
                //run:
                traverseClientBatches(updateUsedClients);

//check if ng->g->num_avail=0, set g->num_used to 0
                traverseAllClientGroups(0, setNetworkAvailability, 0);

//update total # clients that have backed up already
                // by s.num_cls_used - which counts for this batch only
                sg->num_cls_used += s.num_cls_used ;
                //reset total num cls used in this shift
                s.num_cls_used = 0;
```

```
                    //traverseAllClientGroups(resetNumClsUsed, resetNumClsUsed,
                    //0);

//if we finished the clients in this group, go to next server
                    //group, else create new batch
                    if (trace) output << "num_cls_used=" << sg->num_cls_used << "
                      num_cls="
                    << sg->num_cls << " num=" << sg->num << " client_batch_num="
                      << sg->client_batch_num <<endl;
                    if (sg->num_cls_used >= sg->num_cls) break;
                    else {
                        //create a new server group record for this batch
                        ServerGroup *sgold = sg;
                        sg = sgL->insertElement();
                        //copy the value input variables (not the pointers or the
                        //output vars)
                        sg->copyValues(sgold);
                    } //end else } //end for loop
            if (batch_cntr >= LOOP_CNTR) output << " WARNING: in
         CapModel::doModelFunc batch_cntr was at limit" << endl;

} //end for server groups return rc;

} // -- end doModelFunc ----------------------------------------------

/*---------------------------------------------------------------------
        * Name:    findHowManyClientsAreUsed
         *
         * Action:
         *      calculates N at which network or server utilization
         *      reaches target
         *      it operates on one client type at a time, although there
         *      can be several
         *      already in
         *   set #of cls used = 0 for all types
         *   traverse list of nets and clients until we find a type with
```

SA9-96-001                                                A5

```
 *      c->num_avail > 0
 *      set #of cls used = #available for this type
 *      do mean_value_model
 *         -if util too low add more types:
 *            traverse list of nets and clients until we find a type
 *            with
 *            c->num_avail > 0
 *                set #of cls used = #available for this type;
 *                do mean_value_model:
 *                   -if util too low add more types: stay in loop
 *                   -if util too high go down on # cls until
 *                       reaching right #
 *                   -if util in range get out of loop
 *         -if util too high go down on # cls until reaching right #
 *             and return
 *         -if util in range, return
 *
 * Arguments:
 *      model type
 *      which util to compare (network or server)
 *      its desired value
 *
 * Return
 *      N at which network or server utilization reaches target
 *
 *
 * Side
 * Effects:
 *
 *---------------------------------------------------------------*/
retCode    CapModel::findHowManyClientsAreUsed()
{
    retCode rc = RC_SUCCESS;

//   set #of cls used = 0 for all types
    //   traverse list of nets and clients until we find a type
    //   with c->num_avail > 0; current g, n and c are stored by
    //   CapModel as g_curr, n_curr and c_curr;
    //   set #of cls used = #available for this type;
    // -- all done in calcNumFirst
    SimpleList<NetworkGroup>      *ngL = sg->networkGroupList;
    for (ng = ngL->gotoHead(); ngL->isnotatEnd(); ng = ngL->advance())
```

SA9-96-001            A6

```
            {
                if (ng->gate_num_avail < 1) continue;
                if (ng->net_num_avail < 1) continue;

//set current gate and net
                g_curr = ng->g;
                n_curr = ng->n;

//calc # gates and nets used by this group:
                calcNumGatesPerGroup(g_curr);
                calcNumNetsPerGroup(g_curr, n_curr);

                //copy the clientList into another place, because the
                //original one is changed when traversed in mean_value_model;
                SimpleList<Client>      *fcL = ng->n->clientList;
                for (c_curr = fcL->followGotoHead(); fcL->followIsnotatEnd();
                        c_curr = fcL->followAdvance())
                {
                    //call findHowManyClientsAreUsed recursively
                    if (c_curr->num_avail < 1) continue;
                    //  set #of cls used = #available for this type
                    c_curr->num_used = c_curr->num_avail;
                    //this assumes that the below are 0 going in first time
                    n_curr->num_cls_used += c_curr->num_used;
                    g_curr->num_cls_used += c_curr->num_used * n_curr->num_used;
                    s.num_cls_used += c_curr->num_used * n_curr->num_used *
                g_curr->num_used;

                    //set # clients to high limit
                    setHighBounds();

//   do mean_value_model
                    if ((rc = mean_value_model()) not_equal RC_SUCCESS) return rc;
                    reportBounds();

                    //check util vs desired range
                    rcType      rcu = checkAllUtils();

// -if util in range, return
                    //if (rc   equal   UTIL_AT_TARGET) break;
                    if (rcu  equal   UTIL_AT_TARGET) return rc;
                    //add enum RcType with UTIL_xxx to Model.h and declare RcType rc;
```

```
            //change checkAllUtils to return rc of correct value
            // -else if util too high go down on # cls until reaching right #
            //and return
            else if (rcu  equal  UTIL_TOO_HIGH)
            {
                rc = findLessClientsToBeUsed();
                return rc;
            }

// -else if util too low add more types:
            else if (rcu  equal  UTIL_TOO_LOW) {
                    continue;
            } else cerr << " wrong rcu " << rcu << endl;
        } //end for client
      } //end for gateway return rc;

} // -- end findHowManyClientsAreUsed
------------------------------------------------

/*------------------------------------------------------------
     * Name:   findLessClientsToBeUsed
     *
     * Action:
     *      calculates N at which network or server utilization reaches target
     *      it operates on one client type at a time, although there can be
     *      several already in
     *
     * Arguments:
     *      model type
     *      which util to compare (network or server)
30   *      its desired value
     *
     * Return
     *      N at which network or server utilization reaches target
     *
     *
     * Side
```

```
 * Effects:
 *
 *----------------------------------------------------------------*/
       retCode    CapModel::findLessClientsToBeUsed()
       {
               retCode rc = RC_SUCCESS;

//low boundary
               //traverse networks and set Nlow=1, Nhigh = n->num, Nnew= Nhigh
               setLowBounds();
               calcNumClientsPerGroup();

//do run with new #s
               if ((rc = mean_value_model()) not_equal RC_SUCCESS) return rc;

reportBounds();

//if one util is more than target even for this lowest # of conc. cls,
               //return
               rcType rcu = checkAllUtils();
               if (rcu  equal  UTIL_TOO_HIGH) return rc;

//else answer is somewhere in between - set Nnew to mid interval
               //traverse clients and set Nnew = (Nlow + Nhigh) / 2
               setMiddleBounds();
               calcNumClientsPerGroup();

//do run with new #s
               if ((rc = mean_value_model()) not_equal RC_SUCCESS) return rc;
               reportBounds();

             rcu = checkAllUtils();
               if (rcu  equal  UTIL_AT_TARGET) return rc;

//take upper half of interval if (*bt < max_util) Nlow = Nnew;
               //take lower half of interval else Nhigh = Nnew;
               chooseNewBounds(rcu);

             //halve the interval - for decreasing function
               do{
                   //traverse clients and set Nnew = (Nlow + Nhigh) / 2
                   setMiddleBounds();
```

```
                calcNumClientsPerGroup();

//do run with new #s
                if ((rc = mean_value_model()) not_equal RC_SUCCESS) return rc;
                reportBounds();

rcu = checkAllUtils();

//got our value
                //quit when we reached first value < max_util:
                //we know this by checking sign of product
        //(u-max_util)(uold-max_util)
                //if coming from values smaller than max_util,
                //we keep the old value of Nnew, i.e. Nlow(which is < max)
                loop_criterion_met = False;
                checkCriterion(rcu);

} while (loop_criterion_met);

return rc;

} // -- end findLessClientsToBeUsed
-------------------------------------------------

/*------------------------------------------------------------------
 * Name:    checkAllUtils
 *
 * Action:
 *          returns UTIL_TOO_LOW if the current network, gateway and server
 *          have utils below 90% of target
 *          returns UTIL_TOO_HIGH if the current network, gateway and server
 *          have utils above 110% of target
 *          returns UTIL_AT_TARGET if the current network, gateway and server
 *          have utils above 90% of target and below 110% of target
 *
 * Arguments:
 *
 * Return
 *
 *
 * Side
 * Effects:
```

```
 *
 *-------------------------------------------------------------*/
rcType  CapModel::checkAllUtils()
{
    rcType    rc;

//check if the utils of every network are already below limit.
    if ((s.cpu_util >= max_srv_util) or
        (s.io_util  >= max_srv_util) or
        (s.log_util >= max_srv_util) or
        (n_curr->util >= max_util) or
        (g_curr->util >= max_util) )   rc = UTIL_TOO_HIGH;

else if ((s.cpu_util <= 0.9 * max_srv_util) or
        (n_curr->util <= 0.9 * max_util) or
        (g_curr->util <= 0.9 * max_util) )   rc = UTIL_TOO_LOW;

else rc = UTIL_AT_TARGET;

return rc;

} // -- end checkAllUtils ----------------------------------

/*-------------------------------------------------------------
 * Name:    checkCriterion
 *
 * Action:
 *      finds which queue has the largest utilization - that's the bottleneck
 *
 * Arguments:
 *
 *
 * Return
 *      bottleneck service center util address
 *
 * Side
 * Effects:
 *
 *-------------------------------------------------------------*/
void   CapModel::checkCriterion(rcType rc)
{
```

SA9-96-001                                           A11

```
        if (! c_curr->Nfound) {
            chooseNewBounds(rc);
            //c_curr->Nfound = (((c_curr->Nhigh - c_curr->Nlow) <= 1)
            c_curr->Nfound = (((c_curr->Nhigh - c_curr->Nlow) < 1)
                 or (c_curr->Nnew <= c_curr->Nmin) or (c_curr->Nnew >=
            c_curr->Nmax)) ? True : False;
        } // end if c_curr->Nfound if (! c_curr->Nfound) loop_criterion_met = True;

} // -- end checkCriterion -----------------------------------------

    /*-----------------------------------------------------------------
    * Name:    findGlobalBottleneck
    *
    * Action:
    *      finds which queue has the largest utilization - that's the bottleneck
    *
    * Arguments:
    *
    *
    * Return
20  *        bottleneck service center util address
    *
    * Side
    * Effects:
    *
    *----------------------------------------------------------------*/
    void    CapModel::findGlobalBottleneck()
    {
            //find max util bottleneck_type = SERVER_CPU;
            bottleneck_util = &s.cpu_util;
            if (s.io_util > *bottleneck_util) {
                    bottleneck_type = SERVER_IO;
                    bottleneck_util = &s.io_util;
            }
            if (s.log_util > *bottleneck_util) {
                    bottleneck_type = SERVER_LOG;
```

```
                    bottleneck_util = &s.log_util;
            }
            traverseAvailableClientGroups(findMaxGatewayUtil, findMaxNetworkUtil,
            0);

} // -- end findGlobalBottleneck
    ------------------------------------------------

/*----------------------------------------------------------------
     * Name:    chooseNewBounds
     *
     * Action:
     *      finds which queue has the largest utilization - that's the bottleneck
     *
     * Arguments:
     *      address of gateway and network to check
     *
     * Return
     *      bottleneck service center util address
     *
     * Side
     * Effects:
     *
     *----------------------------------------------------------------*/ void    CapModel::chooseNewBounds(rcType rc)
    {
        if (! c_curr->Nfound) {

//if the bounds are almost equal we join them
            if ((c_curr->Nhigh - c_curr->Nlow) <= 1) {
                //take lower half of interval
                if (rc equal UTIL_TOO_HIGH)
                {
                    c_curr->Nhigh = c_curr->Nlow;
                    c_curr->Nnew = c_curr->Nlow;
                }
                //take higher half of interval
                else
                {
```

```
                    c_curr->Nlow = c_curr->Nhigh;
                    c_curr->Nnew = c_curr->Nhigh;
                }
            //boundary is bigger than 1
            } else {
                //take lower half of interval
                if (rc  equal  UTIL_TOO_HIGH) c_curr->Nhigh = c_curr->Nnew;

//take higher half of interval
                else c_curr->Nlow = c_curr->Nnew;

} // endif

} // end if not found

} // -- end chooseNewBounds
-------------------------------------------------

/*------------------------------------------------------------------
 * Name:   calcNetGroups
 *
 * Action:
 *      repeat while criterion not met:
 *      criterion is that all networks are used up.
 *          if head of list:
 *              find max network time of remaining networks
 *              create a server list
 *              create first net list entry for this new server and add all
 *                  networks of this max type to it - possibly multiple servers
 *                      if multiple shifts
 *                  calc. how many nets of this type we need, then see
 *                  how many we use:
 *                      even 1 net time is too much - we use none of them:
 *                      that's the case when n_n = 1 and diff >0 and is >
 *                       mindiff
 *                      there are too many nets - we use some of them:
 *                      that's the case when n_avail is > n_n
 *                      there are too few - we use all of them:
 *                      that's the case when n_avail is < n_n
 *                      calc. new value of diff for this network type
```

SA9-96-001    A14

```
 *                      uint n_avail = nmax->num * gmax->num - nmax->num_used;
 *              calculated diff = total server time - max network network time;
 *              if diff < 0, still need to add more networks to saturate server:
 *                  traverse all networks and find next one that fits
 *                  calc. how many nets of this type to add
 *                  add net list entry to server list
 *                  we traverse the net and add server service time to current
 *                  difference between total server service time and max network
 *                  service time;
 *                   we want this difference to be positive, but small in value,
 *                   because
 *                   we want the server to be the bottleneck, but about the same
 *                   util. as
 *                   the network and gateway
 *               scan until getting to first net with unused elements -
 *               then first_avail becomes False
 *          end of do loop, check criterion
 *
 *
 * Arguments:
 *
 * Return:
 *      none
 *
 * Side
 * Effects:
 *
 *-----------------------------------------------------------------*/
void    CapModel::calcNetGroups()
{

// traverse gateway list and calc. total gateway times for each gateway
    //also reset the num_used
    resetServer();
    traverseAllClients(resetGateway, resetNetwork, 0);
    num_available = 0;
    traverseAllClients(initGateway, initNetwork, initClient);

//traverse gateway list and find gateway/network with max service time

//traverse list of gateways; for each calc. if service time on
    //network/gateway is > service time on server;
```

SA9-96-001                                              A15

```
        //keep adding gateways to list until the total service time on the server
        //is larger than largest service time on gateway/network
        // (divided by max. util desired
        uint loop = 0;
        olddiff = 1.0; //has to be > 0 to begin with
        while (num_available > 0) {
            ++loop;
            if (trace) output << " loop = " << loop << " num_available = "
                << num_available << endl;
            traverseAllClients(0, printNumAvailable, 0);

// goes through this branch if finished a server list, prepare to
            //start a new one -
            if (olddiff > 0.0)
            {
                // find network with max. net. service time
                first_available = True;
                traverseAvailableClients(0, findMaxNetwork, 0);

//reset g_last
                traverseAllClients(initGateway, 0, 0);

                //n_avail and g_avail are how many gates and how many nets per
                //gate are unused yet
                uint n_avail = min(nmax->num, nmax->num_cls_avail);
                uint g_avail = min(gmax->num, rat(nmax->num_cls_avail,
            nmax->num));

                //how many nets of this type can work with server at same time
                uint n_c = (uint) (nmax->trans_time / max_util / nmax->srv_time *
                max_srv_util) + 1;
                //how many gates are used up in order to get n_conc nets, when we
                //effective # of conc. nets we can have at same time
                uint n_used = min (n_avail, n_c);
                n_used = min(default_net_num"nmax->type", n_used);
                //how many gates working concurrently
                uint g_used = min (g_avail, rat(n_c, n_avail));
                g_used = min(default_gate_num"gmax->type", g_used);

                //how many times we repeat a gateway
                uint num_gate_groups = g_avail / g_used;
                //how many times we repeat nets inside 1 gate
```

```
                    uint num_net_groups = n_avail / n_used;
                    //total number of shifts is product of shifts for gate and nets
                    //per gate
                    uint num_shifts = num_gate_groups * num_net_groups;
                    if (trace) output << " in calcNetGroups num_shifts = " <<
                num_shifts << endl;

//create new server list and add info from max network
                    createServer(nmax, num_shifts);

//create new network and add all this type to new server list
                    createNetwork(gmax, nmax, g_used, n_used);

//calculate how many nets were left from first batch
                    uint n_left = n_avail - n_used * num_net_groups;
                    uint g_left = num_gate_groups * g_used;

//if there are networks left on the gateway
                    if (n_left > 0)
                    {
                        //calc calc. num gates and nets used in 1 batch of this latter
                        //type
                        n_used = min(n_left, n_c);
                        n_used = min(default_net_num"nmax->type", n_used);
                        g_used = min(g_left, rat(n_c, n_left));
                        g_used = min(default_gate_num"gmax->type", g_used);
                        num_shifts = rat(g_left * n_left, g_used * n_used);
                        createServer(nmax, num_shifts);
                        createNetwork(gmax, nmax, g_used, n_used);

} // end if n_left > 0

//repeat above for gateways eventually left over
                    uint g_last = g_avail - g_left;

if (g_last > 0)
                    {
                        uint n_last = gmax->num;
                        n_used = min(n_last, n_c);
                        n_used = min(default_net_num"nmax->type", n_used);
                        g_used = min (g_last, rat(n_c, n_used));
```

```
            g_used = min(default_gate_num"gmax->type", g_used);
            num_shifts = rat(g_last * n_last, g_used * n_used);
            createServer(nmax, num_shifts);
            createNetwork(gmax, nmax, g_used, n_used);
            gmax->last = g_last;

} //end if g_last > 0

//calc first value of diff that we have to try to make positive
        //and small in absolute value
        olddiff = (sg->srv_time / max_srv_util - sg->trans_time /
        max_util)
            * ng->num * ng->num_gates;
        if (trace){
            output << " in calcNetGroups n_avail = " << n_avail << " and
            g_avail = "
            << g_avail << endl;
            output << "n_used = " << n_used << " and g_used = " << g_used
            << " and olddiff = " << olddiff << endl;
        }

//decrement # of nets available
        num_available -= nmax->num_cls_avail;

//recalc. num. nets remaining - all of this type used up
        nmax->num_used = nmax->num;
        nmax->num_cls_avail = 0;

} // end if olddiff > 0.0
    //goes through this branch if it can still add networks to the current
    //list if criterion not met, we find another network to add to the
    //current (last) server.
    //criterion is: if max net time in list is > total srv time of list
    else
    {
        mindiff = 0.0;
        first_available = True;
        traverseAvailableClients(0, findAdditionalNetwork, 0);

//at the end update num_used of network that was the last minimum
        ng->n->num_used += ng->num;
        //only increasy # gates used when all their nets are used
```

SA9-96-001 A18

```
                    if (ng->n->num_used  equal   ng->n->num) ng->g->num_used +=
            ng->num_gates;

//update server list info
                    olddiff = mindiff;
                    //decrement # of nets available
                    num_available -= ng->num * ng->num_gates;
                    if (num_available < 0) {
                         cout << "num_available < 0 " << endl;
                         output << "num_available < 0 " << endl;
                    }
                    ng->n->num_cls_avail -= ng->num * ng->num_gates;

} // end else if olddiff > 0.0

} // end while num_available > 0

} // --- end calcNetGroups
----------------------------------------------------------

/*-----------------------------------------------------------------
 * Name:    findAdditionalNetwork
 *
 * Action:
 *              we got here if not all networks are used
 *              at first non used element add new network to current server
 *              list
 *              calc. how many nets of this type we need, then see
 *              how many we use:
 *              even 1 net time is too much - we use none of them:
 *              that's the case when n_n = 1 and diff >0 and is > mindiff
 *              there are too many nets - we use some of them:
 *              that's the case when n_avail is > n_n
 *              there are too few - we use all of them:
 *              that's the case when n_avail is < n_n
 *              how many gates working concurrently
 *              check if new diff is closer to what we want: smaller in
 *              absolute value and positive
 *
 *
```

```
 * Arguments:
 *
 * Return:
 *       none
 *
 * Side
 * Effects:
 *
 *------------------------------------------------------------------*/
void    CapModel::findAdditionalNetwork(Gateway *g, Network *n)
{
        uint g_used;
        //calc. num of gates and nets we can use at same time
        uint n_avail = min(n->num, n->num_cls_avail);
        uint g_avail = min(g->num, rat(n->num_cls_avail, n->num));
        uint n_n = (uint) (fabs(olddiff) / n->srv_time * max_srv_util) + 1;
        uint n_used = min (n_avail, n_n);
        g_used = min (g_avail, rat(n_n, n_avail));

//how many gates working concurrently
        //if we're looking at max net, this has already established what #
        //gates it uses - from gmax last shift, have to use same one float diff = olddiff + n->srv_time / max_srv_util * g_used * n_used;
        if (trace)
        {
            output << " in findAdditionalNetwork n_avail = " << n_avail << "
            and g_avail = "
            << g_avail << endl;
            output << "n_used = " << n_used << " and g_used = " << g_used << "
            and diff = " << diff << endl;
        } if (g->last > 0)
        {
            g_used = g->last;
            n_used = min (n_avail, rat(n_n, g_used));
        }
        else
        {
            n_used = min (n_avail, n_n);
```

SA9-96-001                         A20

```
            g_used = min (g_avail, rat(n_n, n_avail));
            g->last = g_used;
        }

//at first non used element add new network to current server list
        //fill in this element with data
        if (first_available)
        {
            //if this gate type already in use for this run, use same # gates createNetwork(g, n, g_used, n_used);

mindiff = diff;
            first_available = False;
        }

//at following elements compare data in element with new one scanned
        //and if new is better matched, reassign data
        //calc. how many nets of this type we need, then see
        //how many we use:
        //check if new diff is closer to what we want: smaller in
        //absolute value and positive
        else if  (((diff > 0.0) and (mindiff < 0.0)) or
                  ((diff > 0.0) and (mindiff > 0.0) and (diff < mindiff)) or
                  ((diff < 0.0) and (mindiff < 0.0) and (diff > mindiff)))
        {
            initNetwork(g, n, g_used, n_used);
            mindiff = diff;
        } //end not first_avail } // --- end findAdditionalNetwork
----------------------------------------------

/*----------------------------------------------------------------
 * Name:    calcNumGatesPerGroup
 *
 * Action:
 *      go over list gateway group and : 1) zero out gates that are not in
 *      current list; 2) make # g->num_used equal to that in list
```

```
 *
 *
 * Arguments:
 *
 * Return:
 *       none
 *
 * Side
 * Effects:
 *
 *----------------------------------------------------------*/
void    CapModel::calcNumGatesPerGroup(Gateway *g)
{
    g->num_used = ng->num_gates;
    s.num_gates_used += g->num_used;
    if (trace) output << "in calcNumG: g->num_used = " << g->num_used
        << " and num_gates_used= " << s.num_gates_used << endl;

} // --- end calcNumGatesPerGroup ----------------------------------

/*----------------------------------------------------------
 * Name:   calcNumNetsPerGroup
 *
 * Action:
 *      number of nets used: as many as available per net
 *
 *
 * Arguments:
 *
 * Return:
 *       none
 *
 * Side
 * Effects:
 *
 *----------------------------------------------------------*/
void    CapModel::calcNumNetsPerGroup(Gateway *g, Network *n)
{
    n->num_used = ng->num;
    //here num_nets_used is # of nets available per gateway
    g->num_nets_used += n->num_used;
```

```
            s.num_nets_used += g->num_used *  n->num_used;
            if (trace) output << "in calcNumN: n->num_used = " << n->num_used
            << " and num_nets_used= " << g->num_nets_used << endl;
            n->num_cls_used = 0;

        } // --- end calcNumNetsPerGroup ----------------------------------------

/*--------------------------------------------------------------------
        * Name:    calcNumClientsFirst
        *
        * Action:
        *       calcs # clients than can be used in this shift; records # already
        *       used in last shift as num_avail for later use in
        *       calcNumClientsPerGroup
        *
        *
        * Arguments:
        *
        * Return:
        *       none
        *
        * Side
        * Effects:
        *
        *-------------------------------------------------------------------*/
        void    CapModel::calcNumClientsFirst(Gateway *g, Network *n, Client *c)
        {
            //recorde here initial value of num_used; in findUtil we
            //repeatedly change the value of num_used, and we need to know
            //what it was before to only change the total counters by the
            //difference
            //make sure we set c->num_used to 0 before we started
            c->num_used = 0;
            c->num_avail = c->num;
            ng->gate_num_avail += c->num_avail * ng->num ;
            ng->net_num_avail += c->num_avail;
            sg->num_cls += ng->num_gates *  ng->num * c->num_avail;
            if (trace) output << "in calcNumClientsFirst: sg->num_cls = " <<
        sg->num_cls << endl;
```

```
    } // --- end calcNumClientsFirst
    ----------------------------------------------

/*----------------------------------------------------------------
    * Name:    calcNumClientsPerGroup
    *
    * Action:
    *       calcs # clients than can be used in this try; records #
    *       used in last try in order to update the counters by their difference
    *
    *
    * Arguments:
    *
    * Return:
    *       none
15  *
    * Side
    * Effects:
    *
    *----------------------------------------------------------------*/
    void    CapModel::calcNumClientsPerGroup()
    {
        //recorde here initial value of num_used; in findUtil we
        //repeatedly change the value of num_used, and we need to know
        //what it was before to only change the total counters by the
        //difference
        //make sure we set c->num_used to 0 before we started
        uint num_old = c_curr->num_used;
        //here n->Nnew is # of cls available per network
        // and c->num_avail is c->num remaining after the previous shifts
        c_curr->num_used = min(c_curr->num_avail, c_curr->Nnew);
        n_curr->num_cls_used += c_curr->num_used - num_old;
        g_curr->num_cls_used += (c_curr->num_used - num_old) * n_curr->num_used;
        s.num_cls_used += (c_curr->num_used - num_old) * n_curr->num_used *
    g_curr->num_used;
        if (trace) output << " in calcNumC: c_curr->num_used = " <<
    c_curr->num_used
        << " and num_cls_used = " << n_curr->num_cls_used << endl;
```

} // --- end calcNumClientsPerGroup
------------------------------------------------

```
/*-----------------------------------------------------------------
 * Name:    updateUsedClients
 *
 * Action:
 *       we have multiple batches, so after findUtil we update # used alreday
 *
 *
 * Arguments:
 *
 * Return:
 *         none
 *
 * Side
 * Effects:
 *
 *-----------------------------------------------------------------*/
void    CapModel::updateUsedClients()
{
        Network   *n = ng->n;
        Gateway   *g = ng->g;
        Client    *c = cg->c;

//for this iteration
        //multiply # clients used by how many repeats of the batch there are
        //update other counters by the difference between old and new # used
        n->num_cls_used += c->num_used * sg->client_batch_num - c->num_used;
        g->num_cls_used += (c->num_used * sg->client_batch_num - c->num_used)
                * n->num_used;
        s.num_cls_used += (c->num_used * sg->client_batch_num - c->num_used)
                        * n->num_used * g->num_used;
        //update total size backed up so far
        overall_size_ch += sg->num * sg->client_batch_num * n->num_used *
        g->num_used * c->num_used * c->w.size_ch;
        //for next iteration
        c->num_avail -= c->num_used * sg->client_batch_num ;
        ng->net_num_avail -= c->num_used * sg->client_batch_num;
        ng->gate_num_avail -= c->num_used * n->num_used *
sg->client_batch_num;
```

SA9-96-001                            A25

```
        c->num_used = 0;

} // --- end updateUsedClients ---------------------------------------------- endif

// end of file
```

Appendix B

```
     RUN NUMBER 1

Inputs are:
     Run Type: cap planning
     Run Description: This is a project entered from GUI Server Name: Server
             Server CPU Type: aix590
             Server IO Type: aix disk
             Server Number of IO Devices: 4
     Server Number of Backup Versions: 1
     Inputs are:
             Number of Clients in Enterprise: 600

Network Net_tr of type: token ring 16Mb and protocol type: TCP/IP
             Available bandwidth: 100 %
             Number of networks   : 4
                     Client AIX-TR of type: aix340
                     Number of clients per network: 20
                             Workload Type: user defined
                             Workload Size: 1000
                             Backup type: selective, not compressed
                     Client OS2-TR of type: os2m95
                     Number of clients per network: 80
                             Workload Type: user defined
                             Workload Size: 300
                             Backup type: selective, not compressed Network Net_eth of type: ethernet 20Mb and protocol type: TCP/IP
             Available bandwidth: 100 %
             Number of networks   : 4
                     Client AIX-ET of type: aix340
                     Number of clients per network: 10
                             Workload Type: user defined
                             Workload Size: 1000
                             Backup type: selective, not compressed
                     Client OS2-ET of type: os2m95
                     Number of clients per network: 40
                             Workload Type: user defined
```

```
                    Workload Size: 200
                    Backup type: selective, not compressed Backup Time Window (hrs): 6
        Desired Server Utilization: 0.8
        Desired Network Utilization: 0.8

Outputs are:

New schedule:
Number of schedules: 20
Backup time for each schedule: 0:22:40 hr:min:sec
Total backup time for this schedule: 7:33:23 hr:min:sec
Server CPU util. is 36%
Server IO util. is 16%
Server Log util. is 6%

Network Net_eth of type ethernet 20Mb : 1 per server, util. is 74%

Client AIX-ET of type aix340  : 2 per network, util is 16%
                Class truput is 1470.38 KB/sec and backup time is 0:11:20
hr:min:sec New schedule:
Number of schedules: 32
Backup time for each schedule: 0:25:32 hr:min:sec
Total backup time for this schedule: 13:37:25 hr:min:sec
Server CPU util. is 78%
Server IO util. is 4%
Server Log util. is 11%

Network Net_eth of type ethernet 20Mb : 1 per server, util. is 40%

Client OS2-ET of type os2m95  : 5 per network, util is 59%
                Class truput is 652.45 KB/sec and backup time is 0:12:46
hr:min:sec New schedule:
Number of schedules: 20
Backup time for each schedule: 0:23:16 hr:min:sec
Total backup time for this schedule: 7:45:29 hr:min:sec
Server CPU util. is 65%
```

B2

```
    Server IO util. is 16%
    Server Log util. is 6%

Network Net_tr of type token ring 16Mb : 2 per server, util. is 72%

Client AIX-TR of type aix340  : 2 per network, util is 15%
                   Class truput is 2864.31 KB/sec and backup time is 0:11:38
    hr:min:sec New schedule:
    Number of schedules: 40
    Backup time for each schedule: 0:23:18 hr:min:sec
    Total backup time for this schedule: 15:32:22 hr:min:sec
    Server CPU util. is 70%
    Server IO util. is 10%
    Server Log util. is 40%

Network Net_tr of type token ring 16Mb : 2 per server, util. is 46%

                   Client OS2-TR of type os2m95  : 4 per network, util is 58%
                   Class truput is 1716.06 KB/sec and backup time is 0:11:39
    hr:min:sec Total elapsed time is 160122 sec or 44:28:41 hr:min:sec
    Effective throughput is 1.54882 MB/sec
```

B3

We claim:

1. A method for scheduling a backup service in a computer installation having a plurality of clients consisting of more than one client type, a plurality of interconnected networks and at least one server, the method comprising the steps of:

(a) building a model of the computer installation which calculates elapsed time and utilization of computer installation resources for the selected service for a selected subset of clients for the selected service for a selected subset of clients, the model using definitions of client types, network types and interconnection of clients and networks in the computer installation;

(b) repeatedly invoking the model with a minimum number of clients and then a maximum number of clients of a single type to find elapsed times and utilization of computer installation resources, then invoking the model with varying numbers of clients between the minimum and maximum numbers of clients until finding a number of clients for the subset for which the utilization or elapsed time criteria are met and adjusting the subsets to contain clients which can be serviced sequentially without exceeding an elapsed time criterion or a utilization criterion; and (c) generating a schedule by arranging the subsets into a sequence.

2. The method of claim 1 wherein the invoking step initially groups the clients into subsets by network and type.

3. An apparatus for scheduling a backup service in a computer installation having a plurality of clients consisting of more than one client type, a plurality of interconnected networks and at least one server, comprising:

(a) a Modeler which calculates utilization of computer installation resources and elapsed time for the selected service for a selected subset of clients, the calculations using definitions of client types, network types and interconnection of clients and networks in the computer installation, using queues to model elements in the installation which work to provide the services and using Little's Law to calculate throughput; and (b) a Scheduler which repeatedly invokes the Modeler with subsets of clients to find utilizations and elapsed times and adjusts the subsets to generate a schedule which is a list of subsets of clients which can be serviced sequentially without exceeding a utilization criterion or an elapsed time criterion.

4. The apparatus of claim 3 wherein the services being scheduled are backup services.

5. The apparatus of claim 4 wherein the Modeler uses queues to model elements in the installation which work to provide the services.

6. An apparatus for scheduling services in a computer installation having a plurality of clients consisting of more than one client type, a plurality of interconnected networks and at least one server, comprising:

(a) first means for modeling utilization of the computer installation resources for services for a selected subset of clients, which calculates utilization of installation resources using definitions of client types, network types and interconnection of clients and networks in the computer installation;

(b) second means for modeling which calculates elapsed time for the selected service for a selected subset of clients using Little's Law to calculate throughput;

(c) means for scheduling which repeatedly invokes the first and second means for modeling with subsets of clients to find utilizations and elapsed times for the subsets and adjusts the subsets to generate a schedule which is a list of subsets of clients which can be serviced sequentially without exceeding a utilization criterion or an elapsed time criterion.

7. The apparatus of claim 7 wherein the service being scheduled is a backup service.

8. The apparatus of claim 6 wherein the first means for modeling use queues to model elements in the installation which work to provide the service.

9. The apparatus of claim 7 wherein the means for scheduling initially divides the clients into subsets based on client type and network to which the clients are attached.

10. A computer readable storage device containing program code for scheduling a selected service in a computer installation having a plurality of clients consisting of more than one client type, a plurality of interconnected networks and at least one server, the program code comprising:

(a) program code for modeling utilization of the computer installation resources and elapsed time for the selected service for a selected subset of clients uses Little's Law to calculate throughout, the modeling using definitions of client types, network types and interconnection of clients and networks in the computer installation; and (b) program code for scheduling which repeatedly invokes the program code for modeling with subsets of clients to find utilizations and elapsed times and adjusts the subsets to generate a schedule which is a list of subsets of clients which can be serviced sequentially without exceeding a utilization criterion or an elapsed time criterion.

11. The computer readable storage device of claim 10 wherein the service being scheduled is a backup service.

12. The computer readable storage device of claim 10 wherein the program code for modeling use queues to model elements in the installation which work to provide the service.

13. The computer readable storage device of claim 10 wherein the program code for scheduling initially divides the clients into subsets based on client type and network to which the clients are attached.

* * * * *